Patented Dec. 5, 1939

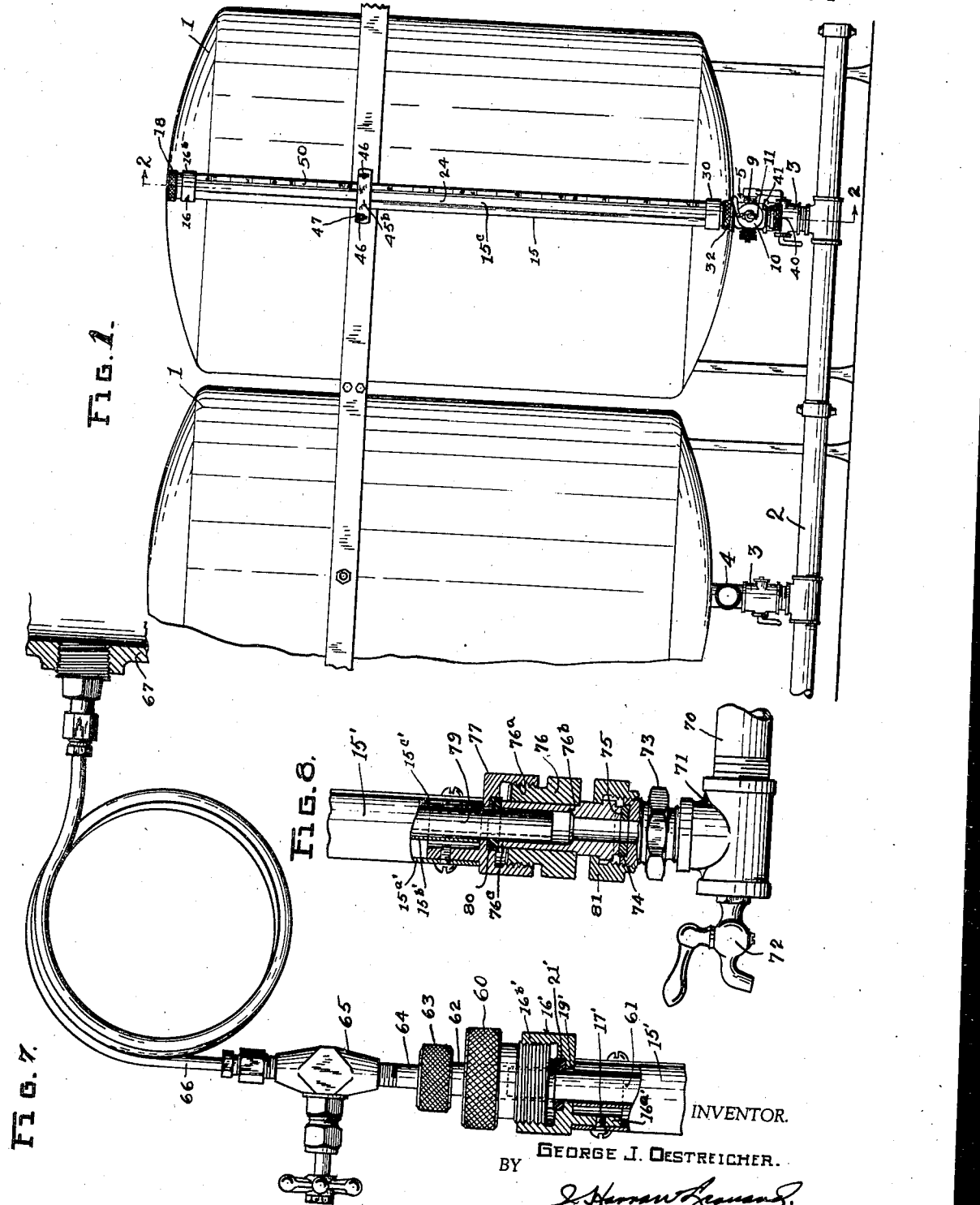

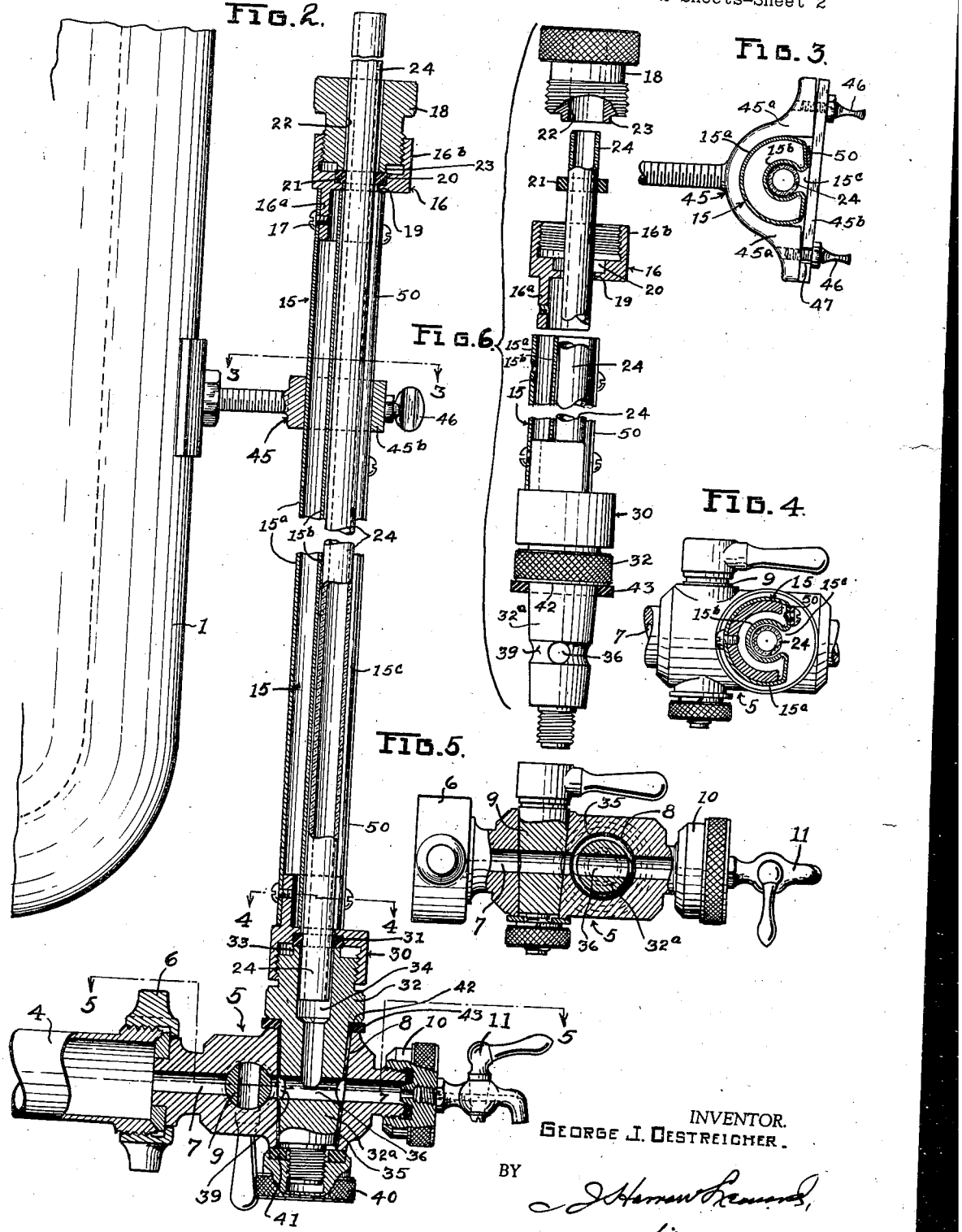

2,182,749

UNITED STATES PATENT OFFICE 2,182,749

LIQUID LEVEL GAUGE

George J. Oestreicher, Cleveland, Ohio

Application June 25, 1936, Serial No. 87,267
Renewed October 17, 1939

4 Claims. (Cl. 73—325)

This invention relates to liquid level gauges for the visual indication of liquid levels in tanks and receptacles and particularly to a portable gauge which can be attached to and removed from tanks and receptacles in which the liquid level is to be gauged.

One of the principal objects of the present invention is to provide a compact and sturdy gauge for this purpose which gauge is self-contained and portable and so constructed that it may be bodily attached to or disconnected from a receptacle while in completely assembled condition, by operating a single manually operated nut.

An equally important object is to provide a portable gauge which, when necessary, may be quickly disassembled for cleaning and as readily reassembled without any tools.

Another object is to provide a glass tube gauge which may be made in greater lengths than heretofore considered practicable and in which the glass tube is protected against stresses due to shocks, expansion, contraction and the like.

A specific object is to provide a gauge in which the glass liquid tube is both sealed and supported solely by rubber, or similar resilient material, out of contact with any of the harder metal parts as a result of which differentials in expansion and contraction between the metal portions and the glass can cause no damage to the glass tube.

Another specific object is to provide elements by which the tube is clamped in place in a manner such that uniform radial pressure only is exerted thereon and axial and angularly directed pressures and forces, due to misalignment of the parts and unequal application on the resilient tube supporting elements, is prevented.

Other objects and advantages will become apparent from the following specification wherein reference is made to the drawings in which Fig. 1 is a front elevation of a plurality of tanks with the connections for attachment of the gauge thereon and with the gauge in operating position with respect to one of the tanks;

Fig. 2 is an enlarged vertical sectional view of the gauge and attachment taken on a plane indicated by the line 2—2 in Fig. 1;

Figs. 3, 4, and 5, are cross sectional views taken on planes indicated by the lines 3—3, 4—4, and 5—5, respectively, in Fig. 2;

Fig. 6 is a side elevation partly in section showing the portable gauge in partly disassembled condition;

Fig. 7 is a side elevation of the upper portion of the gauge showing an adapter for use in connection with the receptacles in which the liquid is under pressure; and Fig. 8 is a fragmentary sectional view of the gauge illustrating a modification of the attaching means therefor.

While the present gauge may be installed in a main which is common to a number of tanks, the tanks being connected to the main through the medium of cut-off valves so the tanks can be connected selectively or concurrently thereto, the advantages of the gauge will become more apparent from a description of the following illustrative example. Furthermore, while the present gauge may be used for gauging the liquid level in steam boilers, beer vats, and on other types of vats, its present advantages are most clearly disclosed in connection with the gauging of milk receptacles in which the necessity for extreme cleanliness of all parts and provision for quick and thorough cleaning must be provided.

For the purposes of illustration, therefore, the gauge is shown for use in connection with a plurality of milk tanks 1 which are connected to a common main 2. Since quite often in the milk industry an extremely large number of tanks are connected to a common main, it is inadvisable to cut off the flow through the main at any time with the result that provision must be made for gauging each tank while the common main is open instead of using a single gauge in the main for all tanks. In such industrial installations, there is provided between each tank and the common main, a suitable cut-off valve 3 so that each may be independently disassociated from the main. Such tanks are usually glass lined and it is inadvisable to install any gauge or fitting which necessitates cutting of the glass lining. Consequently, the usual connection to the main is provided, between the cut-off valve 3 and the tank, with a suitable T-connection 4. Such connections are customarily provided with external threads permitting connection thereto of the usual fire hose type of connection.

Referring to Fig. 2, there is illustrated a gauge receiving socket, designated generally as 5, and having at one end an internally threaded fire hose coupling element 6 arranged for connection with the threaded end of the T-connection 4 so that the socket 5 can be readily connected thereto without the exposure of any threads to the milk.

The socket 5 has a straight longitudinal duct 7 extending entirely therethrough from end to end and preferably of the same diameter throughout its entire length. Intermediate its ends, the socket has a transverse tapered bore 8 which extends entirely therethrough and intersects the duct 7 centrally. The bore 8 is adapted to receive the lower end of the portable gauge, later to be described. Between the tapered bore 8 and the inlet end of the duct 7, the socket is provided with a transverse bore extending at right angles to the bore 8 and to the duct 7 and intersecting the latter, this bore accommodating a tapered plug 9 of a stop cock. The plug 9, in turn, is provided with a bore of the same diameter as the duct 7 so as to form a continuation thereof when the plug 9 is rotated to an open position. The bore which accommodates the plug 9 likewise extends entirely through the socket so as to be readily cleaned.

At the opposite end of the duct 7, the socket 5 is provided with a suitable plug cap 10 having a knurled outer surface so that it may be readily detached manually for permitting ready access into the duct 7. In the form illustrated, the plug cap 10 carries a drain cock 11 which, before removal of the gauge from the socket 5 may be opened to drain any liquid entrapped in the gauge proper. The socket member 5 is mounted on the T-connection 4 and is removed only for purposes of cleaning.

Referring next to the portable gauge proper, the gauge includes a rigid, self-supporting, metal shield or body 15. The shield is preferably formed from a single continuous piece of material turned and formed so as to provide an outer portion 15a which, in cross section, is substantially a circular segment greater than a semi-circle and an inner portion 15b preferably concentric with the outer portion 15a and having its walls parallel thereto. The portion 15b is open slightly in front, as indicated at 15c, so that the glass tube of the gauge, which is positioned within the inner portion of the shield, is readily visible. The resultant shield is therefore a hollow, double-walled shield of U-shaped cross section affording an extremely rigid structure with an insulating pocket of air between the portions 15a and 15b. Thus the shield itself cannot readily be flexed or sprung when moved from place to place so as to pinch and fracture the tubing. Likewise it protects the tube from chilling blasts of air which, when the tube is hot, would be apt to cause too sudden contraction of the tube and breakage thereby. The shield 15 is of uniform cross section throughout its length and open at both ends.

At the upper end of the shield is a header 16 having a depending boss 16a which fits within the shield and lies snugly along the inner face of the wall of the outer portion 15a and is preferably coextensive circumferentially therewith to a point beyond the diameter so that the header is retained in fixed radial position with respect to the shield. A suitable screw 17 may be utilized to secure the header in position. The header has an upturned annular flange portion 16b which is internally threaded for receiving an externally threaded clamping element 18. The header 16 has an axial passage 19 coaxial with the shield portion 15b and has a counterbore 20 of larger diameter than the passage and receiving an expansible resilient washer 21 of rubber or similar material. The clamping element 18 likewise has an axial passage 22 coaxial with the passage 19 and preferably of the same diameter. Both the passages 20 and 22 extend entirely through their associated members and form a continuation of the passage defined by the inner portion 15b of the shield when the members are in operating position.

On the lower end of the clamping element 18 there is provided an annular boss 23 which is slightly less diameter than the counterbore 20 and substantially the same depth as the counterbore. The boss 23 is accurately formed on the element 18 so that, when the element 18 is screwed into the header 16, the boss 23 will be coaxial at all times with the counterbore 20. The glass gauging tube 24 lies within the inner shield portion 15b in slightly spaced relation to the walls thereof, as better illustrated in Fig. 3, and extends through the passages 19 and 22 with slight radial clearance. Since this clearance is necessarily slight, the tubing when installed and clamped in place must retain its concentric position.

For effecting the installation, the tubing is slid through the passage 19 and the washer 21 is placed thereon and lightly pressed into the counterbore 20 whereupon it accurately centers the tube 24. The washer is preferably of the same dimension axially as the depth of the counterbore and the washer, the boss 23, and the counterbore 20 are considerably smaller in diameter than the threaded portion of the element 18. Thus there is never any danger of the washer being subjected to contact with the threads when expanded radially by axial pressure of the boss 23. Furthermore, due to the limited radial dimensions of the boss and washer, the element 18 may be more readily rotated for screwing it into position, as the surface between the boss 23 and the washer 21 is reduced to a minimum and reduces frictional resistance to rotation, the stress on the washer is concentrated and applied absolutely axially on the washer and at absolutely the same distance from the tube at all points about the washer, and the lever arm effective at the outer radial limits of the element 18 is relatively greater. Consequently, the washer 21 is expanded uniformly and to a high degree by hand operation of the element 18 and the slight radial clearance afforded between the tube 24 and the passages 19 and 20 is maintained uniform entirely around the tube. This clamping pressure is so great that the tube cannot be removed except by loosening the element 18, yet it is supported entirely by the washer 21 and is entirely out of contact with any metal.

If desired, the tube can extend entirely through the element 18 and thereabove, as illustrated in Fig. 2, as it preferably is not seated against any abutment at its ends. At the opposite or lower end of the shield 15, a header 30, corresponding in form and function to the header 16 above described is provided, the tube 24 extending therethrough and being similarly retained in place by an expansion washer 31. Instead of the element 18, however, a connecting element 32 is utilized, the upper end of this element being provided with a boss 33 for expanding the washer and being externally threaded for threaded engagement with the header 30. The axial passage 34 of the element 32, while not extending entirely therethrough, extends beyond the lower end of the tube 24 so that the tube is subjected to no axial stresses by engagement with the unyielding end abutments and is not confined axially except by the resilient washers.

The connecting element 32 has a depending tapered portion 32a which is received in the tapered bore 8 of the socket 5. The tapered portion 32a, however, does not fit the bore 8 but is of slightly less diameter to provide radial clearance, as indicated at 35. The portion 32a has a transverse duct 36 of the same diameter as the duct 7 so that when the gauge is installed in the socket and properly aligned, the duct 36 may form a continuation of the duct 7. However, since the gauge may be rotated slightly out of proper position, an annular channel 39 is provided on the portion 32a for connecting the duct 36 with the duct 7 in any rotated position of the gauge, and through the bore 34 of the connection 32 with the tube 24. The lower end of the portion 32a extends beyond the lower end of the bore 8 and socket 5 and is threaded externally to receive an internally threaded cap 40. The cap has a suitable packing or resilient sealing washer 41 which engages a shoulder on the lower portion of the connection 5 when the cap is screwed into place for effecting sealing engagement therewith. Correspondingly, a shoulder 42 is provided at the upper end of the tapered portion 32a and a cooperating shoulder is provided on the socket 5, a resilient washer 43 being disposed between the latter shoulders and compressed by the cap 40 concurrently with the washer 41 for sealing both ends of the bore 8.

The element 18, the cap 40, and the connection 32 are provided with knurled surfaces of large diameter so that they can be readily screwed and unscrewed by hand pressure to a degree sufficient for expanding the associated washers properly.

To remove the gauge from the socket 5, it is only necessary to close the stop cock 9, open the stop cock 11 to drain the tube 24, and then remove the cap 40 and lift the gauge out of position. For cleaning the socket 5, the cap 10 may be removed, the stop cock 9 turned to open position and the duct 7 cleaned readily, since it is of substantially constant diameter and open throughout its length. Obviously the bore 8 can be readily cleaned as it is likewise accessible from both ends. To clean the portable gauge itself, it is only necessary to detach the element 32 by hand, leaving the tube 24 installed in the shield 15. The tube may be readily cleaned from either end. The element 32, itself, having only a single transverse duct and a single intersecting longitudinal duct, both of which are readily accessible, may be cleaned easily. Replacement of the tube 24 may also be accomplished without tools, as is apparent.

In the case of extremely long gauges, it is often desirable that they be supported by the tank or other suitable support as well as by the socket, and for this purpose a clamp 45 is provided. The clamp is mounted on the tank or any other suitable support. This clamp comprises yoke arms 45a which snugly receive the shield 15 and a closure bar 45b which is detachably secured thereto by wing screws 46. The bar is preferably slotted at one end, as indicated at 47, so that by loosening only one wing screw it may be swung out of position for removing the gauge.

As best illustrated in Figs. 1 and 3, there is provided on the forward face of the shield 15 alongside the tube 24 an aluminum strip 50, the strip 50 being provided for marking the calibration of the gauge. To calibrate the gauge it may be attached to the particular tank with which it is to be associated and the tank filled, and then a weighed or measured amount of liquid withdrawn, the liquid level mark being scratched on the strip 50 and marked, after each withdrawal. The marking may be in such units as appear necessary for the particular use. If a single gauge is to be used with two tanks and left permanently in the line except for cleaning, two such aluminum strips may be provided, one at each side of the gauge, one being calibrated for one tank and one for the other, unless the tanks happen to be duplicates. On the other hand, it is quite often desirable to mount the strip 50 directly on the tank, so that the gauge itself discloses only the liquid level, the calibrated strip being positioned to be read for the particular tank.

To use a gauge in connection with tanks or receptacles under pressure, the structure illustrated in Fig. 7 is provided. In this structure the upper end of the gauge is closed by a suitable closure element 60, corresponding insofar as the clamping of the glass tube 61 is concerned with the element 18 heretofore described and being substituted for the element 18. Fixed in the upper end of the element 60 is a suitable tube 62 which is in sealed relation with the element 60 and has a gasket sealed upper end, not shown, adapted for cooperation with a knurled nut 63. The nut 63 is carried on a suitable tube 64 which is connected with a suitable cut-off valve 65, the opposite side of which valve is connected to a coiled conduit line 66. The conduit line 66 is connected, in turn, to a receptacle 67 above the liquid level. Thus by closing the valve 65 and the usual cut-off valve on the gauge socket, the gauge can be readily removed and reconnected. Expansion and contraction, of course, are compensated through the medium of the coiled tube 66.

Referring next to Fig. 8 a modified connection of the bottom end of the gauge with a pipe line is illustrated. Most industrial tanks and receptacles are provided with pipes 70, such as the pipe 2 heretofore described, on the ends of which are T-connections 71 and suitable drain cocks 72, the cocks 72 being fastened on one part of the T-connection. The other part of the connection receives a threaded adapter 73 which generally remains fastened thereto. In the upper end of the adapter, a suitable counterbore 74 is formed which receives a sealing washer 75 and conforms, in general, to the counterbore 20 heretofore described. However, instead of being formed in the connecting elements of the gauge this counterbore is formed directly in the adapter 73. At the lower end of the gauge, instead of the connecting element 32, a connecting element or connecter 76 is provided which has an outer knurled portion and a threaded portion 76a adapted for threaded cooperation with the header 77 of the gauge and a central press fitted portion 76b which has an axial duct for accommodating the lower end of the glass tube 79 with radial and axial clearance. The press fitted portion 76b extends beyond the connector 76 at each end, the upper end forming the boss portion 76c for cooperation with the tube retaining washer 80. The lower end of the portion 76b is provided with a shoulder on which operates a hand operated nut 81 which is threaded internally for cooperation with the upper threaded end of the adapter 73. Thus by hand pressure, the nut 81 can be rotated for drawing the portion 76b tightly against the washer 75 for expanding the same, thus sealing between the portion 76b and the adapter 73 so that a continuous passage for the glass tube into the T-connection 71 is provided. Necessarily, in the line 70, the usual cut-off valve is provided in advance of the T-connection so that the tank can be readily disconnected therefrom. For removing the gauge in this instance, it is only necessary to loosen the one hand nut 81 and lift the entire gauge free of its connection. The adapters 73 are connected in each line and when the gauge is removed, a suitable cap can be screwed thereon for sealing the adapter until again ready for use, as desired.

Having thus described my invention, I claim:

1. In a gauge of the character described, a glass tube, a rigid self-supporting shield body having an inner wall portion in substantially surrounding and closely spaced relation to the tube and a continuing outer wall portion spaced from the inner wall portion and defining a peripherally closed air insulating space therebetween, means carried by the body and securing the tube thereto in said spaced relation, and connecting means for detachably connecting the tube to a conduit with said tube in communication with the conduit.

2. In a gauge of the character described, a glass tube, a rigid self supporting shield body having inner and outer wall portions of substantially U-shaped cross section and joined to define a peripherally closed air space, said inner wall portion partially surrounding the tube in closely spaced relation to the tube, means carried by the body for securing the tube thereto in said spaced relation to the inner wall surfaces, and connecting means for detachably connecting the tube to a conduit with the tube in communication with the conduit.

3. In a gauge of the character described, a glass tube, a rigid self supporting hollow double wall shield in substantially surrounding and closely spaced relation to the tube, headers having flange portions accommodated between the walls of the shield at the ends and having end portions overlying the ends of the walls, means cooperable with said headers respectively for supporting the tube in said spaced relation to the shield, and connecting means for detachably connecting the tube to a conduit with said tube in communication with the conduit.

4. In a gauge of the character described, the combination of a glass tube which is open at its upper end, a shield for the tube extending lengthwise of it and comprising inner and outer wall portions which are spaced apart and connected to form an insulative air space between said portions, the inner of said portions partially encircling the tube, close thereto, said portions extending toward each other from opposite directions adjacent one side of the tube and spaced apart to expose a portion of the tube for enabling reading of the gauge, a header for the lower end of the shield, yielding means associated with the header for supporting the lower end of the tube out of contact with the header and the shield, means associated with the header for connecting the interior of the tube with a conduit adapted to communicate with a tank or like space to be gauged, and yielding means associated with the upper end of the shield for supporting the upper end of the tube.

GEORGE J. OESTREICHER.